W. W. GREEN.
POWER INCREASING APPARATUS FOR MOTOR DRIVEN VEHICLES.
APPLICATION FILED NOV. 10, 1913.
1,146,154.
Patented July 13, 1915.
2 SHEETS—SHEET 2.
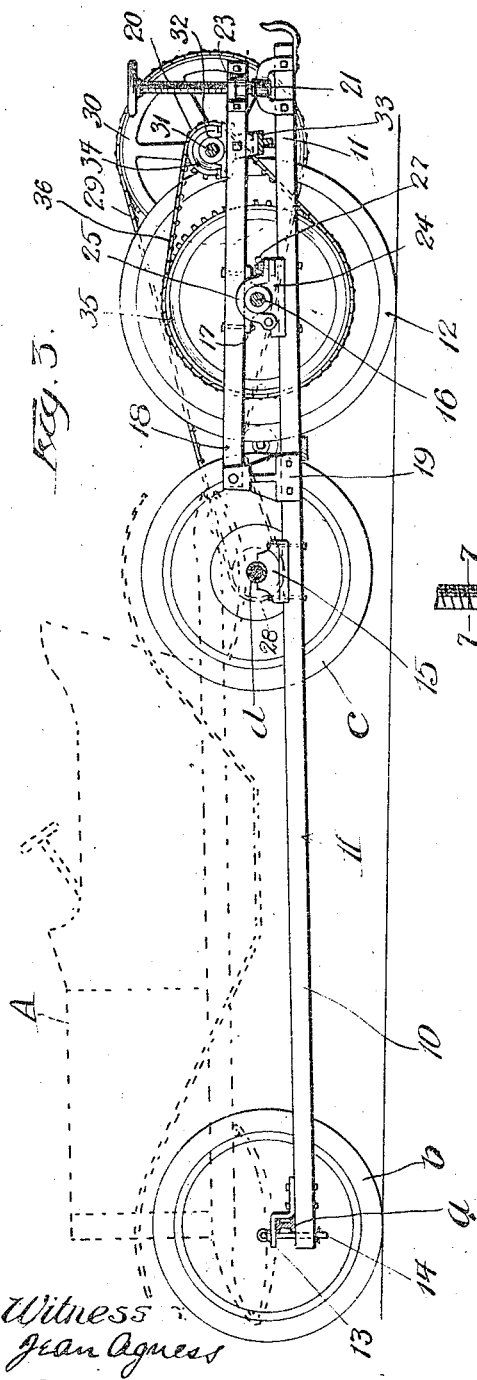
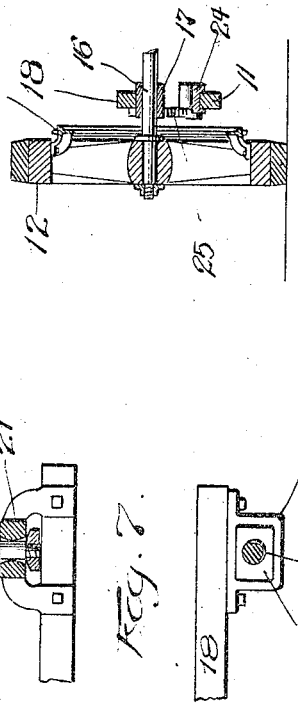
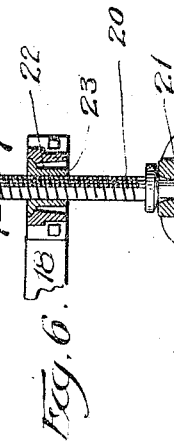
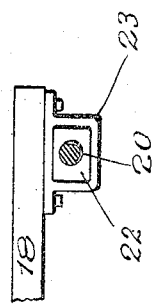
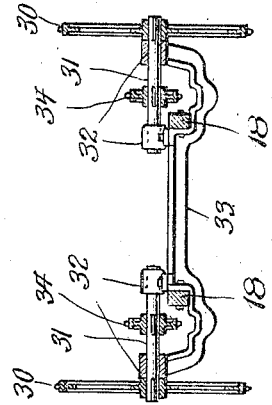
Inventor;
William W. Green
by Charles O. Sherody
his Atty

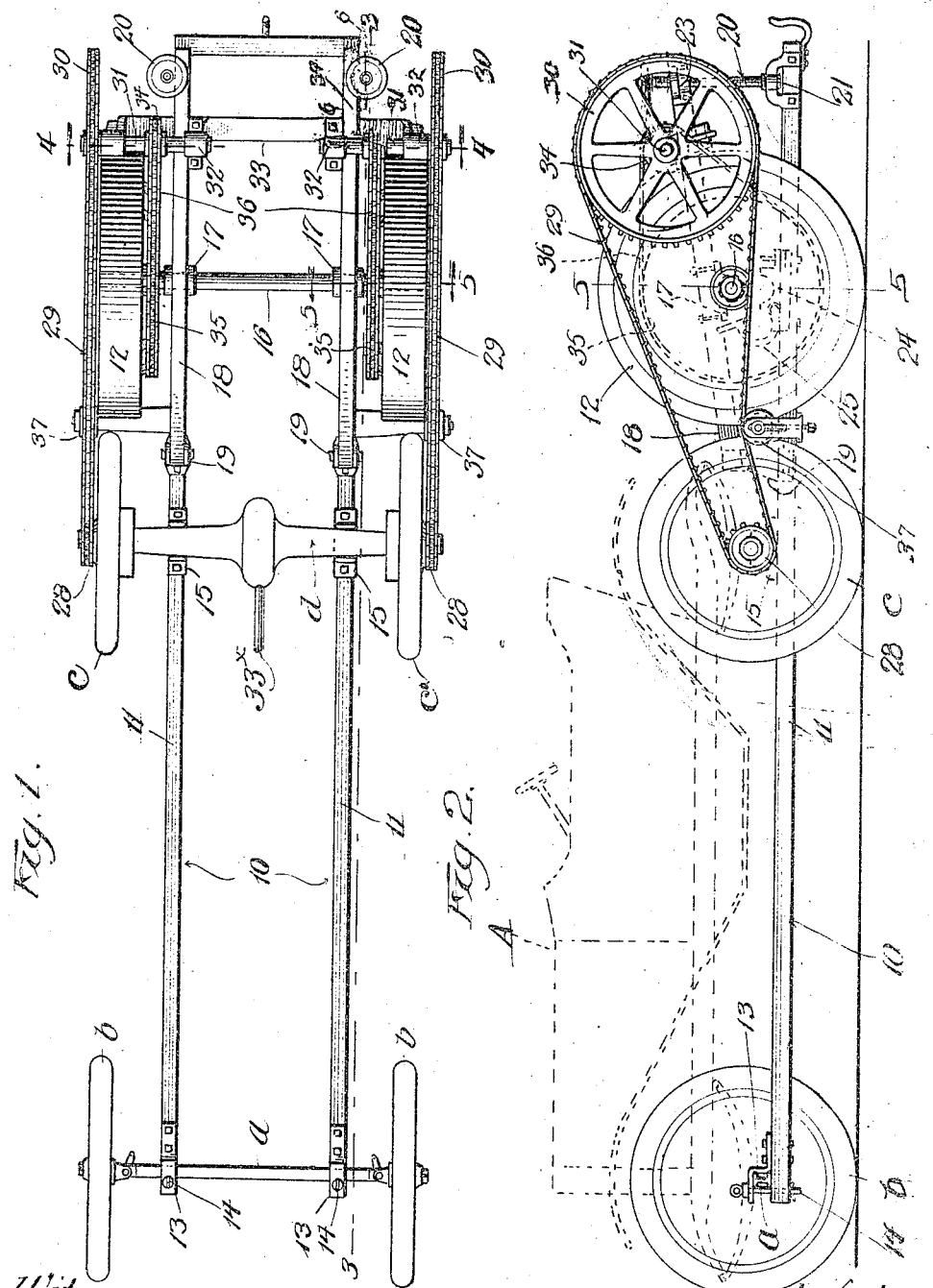

UNITED STATES PATENT OFFICE.

WILLIAM W. GREEN, OF NILES, MICHIGAN.

POWER-INCREASING APPARATUS FOR MOTOR-DRIVEN VEHICLES.

1,146,154.   Specification of Letters Patent.   Patented July 13, 1915.

Application filed November 10, 1913. Serial No. 800,086.

*To all whom it may concern:*

Be it known that I, WILLIAM W. GREEN, a citizen of the United States, and a resident of Niles, county of Berrien, and State of Michigan, have invented certain new and useful Improvements in Power-Increasing Apparatus for Motor-Driven Vehicles, of which the following is declared to be a full, clear, and exact description.

This invention relates to power increasing apparatus for motor driven vehicles and designs to provide means for increasing the power developed in the driving mechanism of motor cars, whereby the high speed thereof may be translated or transformed into low speed, and power, for motor driven or self-propelled apparatus.

One object is to provide transmission gearing between some driven element of the ordinary pleasure car or automobile, and independent low speed or traction wheels that support a frame which may be coupled to the frame or running gear of the automobile and having means for supporting the rear of the automobile independently of the rear wheels thereof, whereby the auxiliary or independent wheels may carry the rear end of the automobile and act as the traction or driving wheels therefor.

The invention consists therefore in a frame, arranged to be readily coupled to an automobile, and having means for supporting the rear thereof, independent of the rear wheels, and including traction wheels, and speed reducing and power increasing transmission gearing between a driven element of the automobile and the traction wheels.

It further consists in the several novel features of construction, arrangement and combination of parts hereinafter fully set forth and claimed.

The invention is clearly illustrated in the drawings accompanying this specification, in which:—

Figure 1, is a plan of an apparatus embodying a simple form of the invention and showing its application to the axles of an ordinary automobile; Fig. 2, is a side elevation thereof with the front axle of the automobile shown in cross section and the automobile body shown in dotted lines; Fig. 3, is a view of the parts seen in Fig. 2, partly in side elevation and partly in longitudinal section, taken on line 3—3, Fig. 1, and showing the parts in operative position when the apparatus is in use as a power device; Fig. 4, is a detail vertical section taken on line 4—4, Fig. 1; Fig. 5, is a detail vertical section of one of the traction wheels of the apparatus and adjacent parts, taken on line 5—5, Figs. 1 and 2; Fig. 6, is a detail vertical section of frame raising mechanism, taken on line 6—6, Fig. 1, and Fig. 7, is a detail horizontal section taken on line 7—7, Fig. 6.

In the embodiment of the invention illustrated in the drawings, 10 designates a frame, which is of strong and substantial construction and having two longitudinally extending frame members 11, 11, which are arranged to be connected to some front portion of an automobile, A, for instance, its front axle, *a*; the rear ends of said frame members being supported by traction wheels 12, preferably of a heavier and more substantial construction than the wheels *b*, *c*, of the automobile. The form of the connection between the forward ends of the frame members 11, and the front axle *a*, of the automobile, is shown to comprise hook-like attachment members 13, one secured to each bar 11, and abutting against the rear of the axle and resting on top thereof. Registering holes are provided in each attachment member 13, and frame member 11, for the reception of a pin or bolt 14, for securing the frame 10, in place in the axle. The frame may be uncoupled by withdrawing the pins 14, and moving the frame and axle apart.

At places on the frame 10, corresponding with the rear axle, *d*, of the automobile, with which the apparatus is used, are bearing blocks 15, upon which the rear axle may rest, said bearing blocks, when the apparatus is in use as a power device, supporting the axle and the parts carried thereby, and holding the rear, driven wheels of the automobile in raised position, free to turn but out of contact with the ground. The bearing blocks 15, are shown as having half round sockets in their upper faces, for the reception of the rear axle of the automobile, to insure a positive connection therewith.

The traction wheels 12, are preferably of larger diameter and wider than the automobile wheels, although not necessarily so, and are independently rotatable, here shown as loosely or rotatively mounted upon an axle or shaft 16, secured in boxes 17, fastened to secondary frame members 18, fulcrumed upon the frame members 11, as for instance, upon brackets 19, secured thereon near the bearing boxes 15. Frame raising mechanism is employed for raising the frame and, as here shown, the other ends of the frame members 18 and 11, are connected by frame raising mechanism, comprising hand screws 20, one on each side of the frame and each connected with and turning in a bracket 21, secured to the frame member 11, and threaded in a block 22, carried by the upper frame member 18. On account of the oscillatory movement of the upper frame members 18, the connection between the lower end of each screw 20, and bracket, is arranged to allow a little play between the screw and bracket, and each block 22, on the upper frame member is supported in a bracket 23, secured to the frame member, the block having a limited amount of play therein to permit the screw to accommodate itself to the angular movement between the upper and lower frame members. Obviously any equivalent frame raising and lowering mechanism may be substituted for the one shown but it served the purpose for illustration. To raise the rear wheels of the automobile and parts carried thereby, the hand screws are turned in the proper direction to draw together the rear ends of the upper and lower frame members 11, 18, thereby raising the lower frame members 11, the upper frame members acting as levers and the axle of the traction wheels 12, serving as the fulcrum of the levers. Bearings or box-like members 24, are secured to the main frame members 11, and have sockets in their upper faces for receiving the round portions of the bearings 17, when the upper and main frame members are drawn toward each other to raise the rear automobile wheels, and stirrup-like members 25, are pivotally secured to the bearing members 24, and are arranged to be swung over the round portions of the bearings 17, and fastened down by bolts and nuts 27, or the like to securely fasten together the bearing members 17, 24, and therewith the two frames.

Power transmission gearing is interposed between some motor driven element of the automobile and the traction wheels, and said gearing is of the speed reducing and power increasing type. For convenience and for the purpose of simplicity the gearing has been shown as interposed between the rear driven wheels of the automobile and the traction wheels, and in the simple form of gearing shown, a small sprocket wheel 28, is attached to each rear wheel $c$, around its hub; trained around each sprocket wheel 28, is a sprocket chain 29, which passes around and drives a large sprocket wheel 30, fast upon a shaft 31, journaled in bearing boxes 32, carried by the upper frame members. I have shown a cross member 33, secured to and connecting the rear ends of the upper frame members, and the bearing boxes 32, may be secured directly thereto, if desired.

The shafts 31, are independent of each other so as to be capable of independent relative rotation to enable the traction wheels (which are geared to rotate therewith) to have independent relative rotation, necessary in turning corners, and inasmuch as the driving shafts of the rear driven wheels of the automobile are, in accordance with the common and well known practice, provided with compensating gearing of some sort, driven from the drive shaft 33×, the traction wheels are, therefore, rotatable in like manner.

Between the two bearing boxes for each shaft 31, is a small sprocket wheel 34, and secured to each traction wheel 12, around its axle is a large sprocket wheel 35, around which sprocket wheels is trained a sprocket chain 36. This provides one form of gearing between the rear driven wheels and traction wheels, for reducing the speed of the traction wheels and therewith increasing the power developed in the driven wheels of the automobile, depending upon the relative diameters of the sprocket wheels, which, of course, may be made to suit the requirements.

The gearing may be entirely uncoupled from the driven wheels of the automobile, or different ratios of gears may be employed whereby the apparatus may be driven at a higher rate of speed, for instance, when connected to the automobile, but not in use as a traction device, and I have illustrated means for uncoupling the gearing from the automobile wheels, the same comprising idlers 37, carried by brackets on the main frame members, over which the chains 29, may run; said chains being made sufficiently long that when the idlers are moved down, the chains may be readily slipped off the sprockets and removed.

The utility and advantages of this innovation are readily apparent. It may be coupled to almost any of the well known forms of pleasure motor vehicles to provide a powerful traction engine to which may be attached farm implements or other objects which require great power to move them. To couple it to an automobile the latter is backed over the forward ends of the frame members 11, and the latter connected with the front axle of the automobile, as before described, and the chains 29, trained around the sprocket wheels 30, and 28, the latter having been attached to the rear wheels of the automobile. The main frame members are now raised by screwing down the hand screws, and the rear automobile wheels therewith raised from the ground. The motor of the automobile having been started, speed is developed in the rear wheels of the automobile, which being free to revolve at a high rate of speed, transmit motion through the speed reducing gearing to the traction wheels, the power being greatly increased and thus converting the apparatus, into a powerful traction device. In this form it can be used for drawing heavy loads or in many other situations wherever a powerful traction device is useful. If desired, the chains 29, may be detached from the sprocket wheels, the frame members 11, lowered to permit the rear wheels of the automobile to run on the ground, and the entire structure propelled at a higher rate of speed, but obviously without the great power developed with the use of the power increasing gearing.

More or less variation of the form of construction shown and described is possible without departing from this invention and I desire, therefore, not to limit myself to the particular form shown and described, but it is my intention to point out in the following claims all of the invention which I have disclosed herein.

I claim as new and desire to secure by Letters Patent:—

1. In an apparatus of the character described, the combination of a main frame, one end of which has attachment means for detachably securing said frame to the front axle of a motor driven vehicle, said frame being arranged to extend underneath the rear axle of said vehicle, a secondary frame fulcrumed upon said main frame, tractor wheels journaled on said secondary frame, frame raising means for raising the rear end of said main frame, and therewith the rear wheels of the motor driven vehicle, and driving connections between the power plant of the motor driven vehicle and said tractor wheels.

2. In an apparatus of the character described, the combination of a main frame, one end of which has attachment means for detachably securing said frame to the front axle of a motor driven vehicle, said frame being arranged to extend underneath the rear axle of said vehicle and having bearing members arranged to engage with said axle, a secondary frame fulcrumed upon said main frame, a pair of tractor wheels journaled upon said secondary frame, frame raising mechanism for raising said main frame and therewith the rear end of said motor driven vehicle, and power increasing gearing interposed between each rear wheel of the motor driven vehicle and a tractor wheel.

3. The combination of a main frame, one end of which has attachment means for detachably securing said frame to the front axle of a motor driven vehicle, said frame being arranged to extend underneath the rear axle of said vehicle, secondary frame members pivotally connected to said main frame, a shaft mounted on said secondary frame members, wheels journaled on said shaft, hand screw members connecting said secondary frame members with said main frame, whereby the main frame is raised to raise the rear vehicle wheels from the ground, and power increasing gearing connecting the rear driven wheels of the vehicle with the wheels on the frame, said gearing being capable of detachment from the rear vehicle wheels.

WILLIAM W. GREEN.

Witnesses:
A. J. Brown,
W. Gardner, Jr.